US008446262B2

(12) United States Patent
Dai

(10) Patent No.: US 8,446,262 B2
(45) Date of Patent: May 21, 2013

(54) REMOTE CONTROL SYSTEM AND METHOD

(75) Inventor: Chong-Qing Dai, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 134 days.

(21) Appl. No.: 13/223,251

(22) Filed: Aug. 31, 2011

(65) Prior Publication Data

US 2013/0027193 A1 Jan. 31, 2013

(30) Foreign Application Priority Data

Jul. 28, 2011 (CN) .......................... 2011 1 0213507

(51) Int. Cl.
*G05B 11/01* (2006.01)

(52) U.S. Cl.
USPC .............. 340/12.22; 340/426.13; 340/426.16; 340/426.19; 340/5.64; 340/539.13; 342/118; 342/140; 342/123

(58) Field of Classification Search
None
See application file for complete search history.

(56) References Cited

U.S. PATENT DOCUMENTS 4,953,972 A * 9/1990 Zuk .............................. 356/4.07
5,159,344 A * 10/1992 Robinson et al. ............... 342/44
5,963,150 A * 10/1999 Bail .............................. 340/988
6,529,131 B2 * 3/2003 Wentworth ................ 340/573.1
6,529,142 B2 * 3/2003 Yeh et al. ....................... 340/988
6,980,813 B2 * 12/2005 Mohi et al. ................. 455/456.1
7,545,259 B2 * 6/2009 Luo et al. ................. 340/426.13
7,612,650 B2 * 11/2009 Nakashima et al. ......... 340/5.72
8,004,400 B2 * 8/2011 Tieman et al. ........... 340/539.13
8,179,229 B2 * 5/2012 Mullet ......................... 340/5.71
8,209,093 B2 * 6/2012 Hill ................................ 701/49
8,232,897 B2 * 7/2012 Tieman et al. ................ 340/990
8,253,529 B2 * 8/2012 Gocho ......................... 340/5.22
8,320,877 B2 * 11/2012 Hansen et al. ............. 455/404.2
2003/0038733 A1 * 2/2003 Willats et al. ............ 340/825.72
2003/0193390 A1 * 10/2003 Muramatsu .............. 340/426.13
2004/0104815 A1 * 6/2004 Suyama et al. .......... 340/426.16
2005/0099275 A1 * 5/2005 Kamdar et al. .......... 340/426.18
2005/0234610 A1 * 10/2005 Shimizu et al. ................. 701/23
2005/0237150 A1 * 10/2005 Sun et al. ...................... 340/5.52
2006/0046684 A1 * 3/2006 Kameyama ................... 455/345
2006/0244574 A1 * 11/2006 New et al. ................ 340/426.22
2006/0255911 A1 * 11/2006 Taki et al. .................... 340/5.72
2007/0040706 A1 * 2/2007 Alrabady et al. ............. 340/991
2007/0265799 A1 * 11/2007 Yamada ........................ 702/152
2008/0048829 A1 * 2/2008 Nakajima et al. ............ 340/5.72
2008/0089269 A1 * 4/2008 Tsutsui ......................... 370/316
2009/0237202 A1 * 9/2009 Mullet ........................... 340/5.7
2010/0138081 A1 * 6/2010 Doukas et al. .................... 701/2
2011/0074633 A1 * 3/2011 Pun et al. ...................... 342/442
2012/0056777 A1 * 3/2012 Shiba ............................ 342/147
2012/0182145 A1 * 7/2012 Jameson et al. ......... 340/539.13
2012/0188128 A1 * 7/2012 Ranki et al. ................... 342/386
2012/0218128 A1 * 8/2012 Tieman et al. ................ 340/989

* cited by examiner

*Primary Examiner* — Benjamin C Lee
*Assistant Examiner* — Rajsheed Black-Childress
(74) *Attorney, Agent, or Firm* — Altis Law Group, Inc.

(57) ABSTRACT

A remote control system includes a receiver equipped in a device and a remote controller. The receiver includes a positioning unit to acquire current position information of the receiver. The controller includes a positioning unit to acquire current position information of the remote controller. The current position information of the remote controller and a control signal is transmitted to the receiver. The receiver further includes a processor to control the device to execute an operation corresponding to the control signal based on the current position information of the remote controller and the receiver.

12 Claims, 5 Drawing Sheets

REMOTE CONTROL SYSTEM AND METHOD

BACKGROUND

1. Technical Field

The present disclosure relates to a control system capable of remotely controlling devices, and remote control method of the system.

2. Description of Related Art

A remote control system for remotely controlling a device, for example, a car, generally includes a remote controller and a receiver equipped in the device. The remote control system allows a user to control operation of the device via operating the controller, for example, lock/unlock a door of a car. The remote controller is commonly an infrared remote controller, which can transmit commands to the receiver from a distance. A problem with the remote controller is that the remote controller is capable of controlling the device even when the user cannot visually locate the device. For example, if the user accidentally uses the remote controller to unlock his/her car at a place he/she cannot see the car, this may cause unwanted entry into the car.

Therefore, it is desirable to provide a control system capable of remotely controlling a device safely to solve the problems mentioned above.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
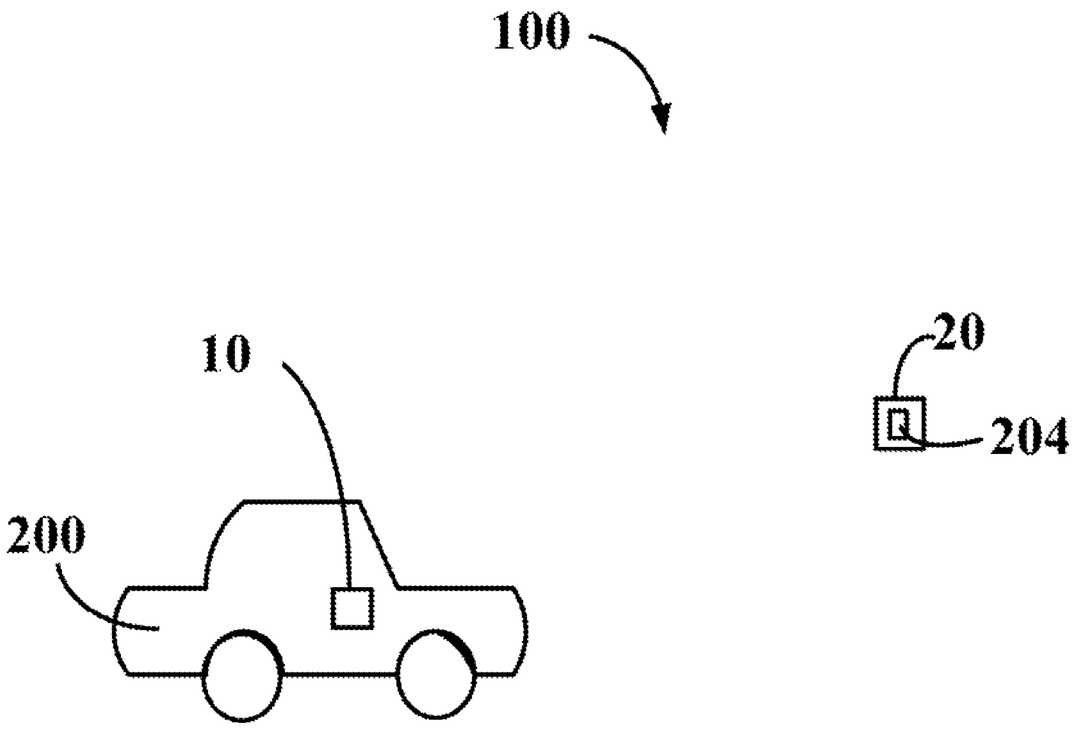
FIG. 1 is a schematic view of a control system capable of remotely controlling a device, in accordance with an exemplary embodiment.
Figure 2:
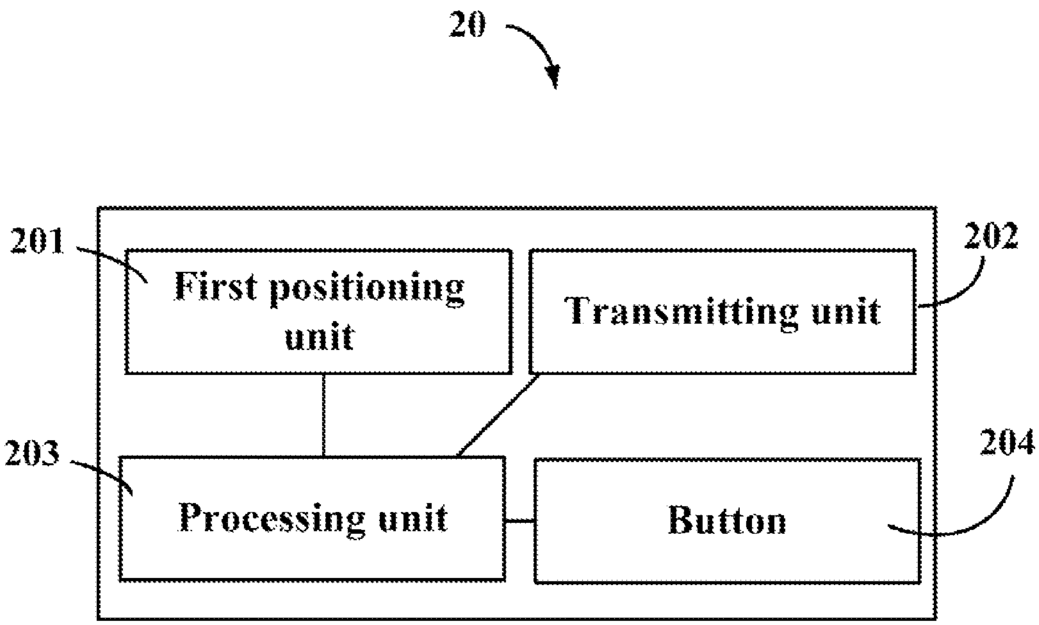
FIG. 2 is a block diagram of a remote controller of the control system of FIG. 1, in accordance with an exemplary embodiment.
Figure 3:
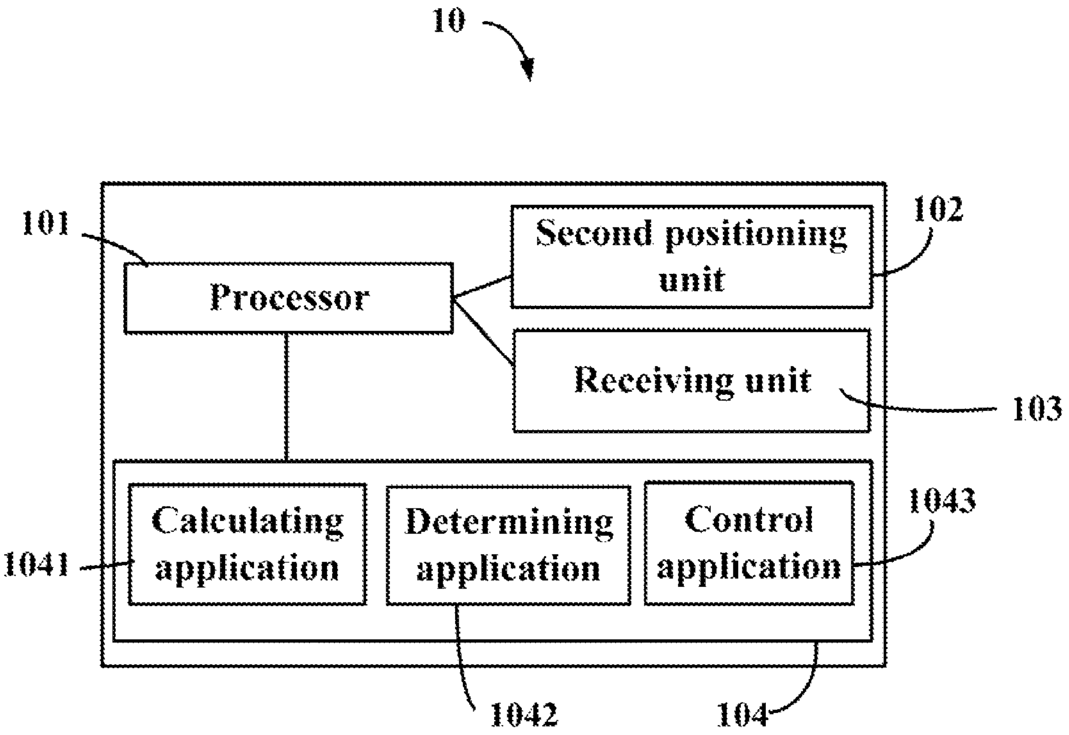
FIG. 3 is a block diagram of a receiver of the control system of FIG. 1, in accordance with an exemplary embodiment.

Referring to FIGS. 1-3, a control system 100 includes a receiver 10 and a remote controller 20. When in use, the receiver 10 is mounted in a device 200, for example, a vehicle. The controller system 100 may be used to remotely control the device 200 to execute operations, for example, control a car to lock/unlock a door of the car.

The controller 20 includes a first positioning unit 201, a transmitting unit 202, a processing unit 203, and a number of buttons 204. The positioning unit 201 obtains current position information of the controller 20. In this embodiment, the first positioning unit 201 is a global position system (GPS) to acquire real-time three-dimensional coordinate (x1, y1, z1) of the controller 20. Each button 204 can be used to control the vehicle 200 to execute a corresponding operation, for example, lock a door of the vehicle 200. The processing unit

203 generates a control signal corresponding to a signal from a pressed button 204, and transmits the control signal and the current position information of the controller 20.

The receiver 10 includes a processor 101, a second positioning unit 102, a receiving unit 103, and a storage unit 104. The second positioning unit 102 obtains current position information of the receiver 10. In this embodiment, the second positioning unit 102 is a global position system (GPS) to acquire real-time three-dimensional coordinate (x2, y2, z2) of the receiver 10. The receiving unit 103 receives the transmitted control signal and the current position information of the controller 20 from the controller 20.

Figure 4:
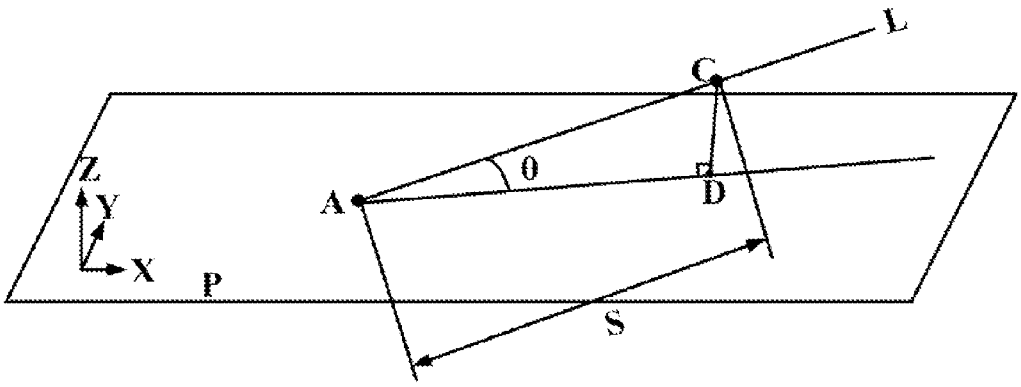
FIG. 4 is a schematic view employed for calculating a distance S between the remote controller and the receiver, an angle θ between a connection line L connecting the remote controller and the receiver, and a horizontal plane P the receiver locates.

Referring to FIG. 4, for simple calculation, points A and C are used to represent the receiver 10 and the controller 20 respectively. The point C has a projection D on a horizontal plane P where the point A locates, and the points A, C, and D form a right-angled triangle. A distance S indicates the distance between the point A and the point C. An angle θ indicates the angle between a connection line L connecting the point A and the point C and the horizontal plane P.

Referring to FIG. 3 again, the storage unit 104 stores a preset distance S1 and a preset angle θ1. The storage unit 104 further stores a calculating application 1041, a determining application 1042, and a control application 1043. The calculating application 1041 includes various software components which may be implemented by the processor 101 to calculate a current distance S and a current angle θ, based on the current position information of the controller 20 and the receiver 10. The determining application 1042 includes various software components which may be implemented by the processor 101 to determine whether the calculated current angle θ is less than the preset angle θ1, and whether the calculated current distance S is less than the preset distance S1. The control application 1043 includes various software components which may be implemented by the processor 101 to control the device 200 to execute an operation corresponding to the received control signal from the remote controller 20 if the current angle θ is less than the preset angle θ1 and the current distance S1 is less than the preset distance S. For example, if the preset distance S1 is 6 miles and the preset angle θ1 is 45°, when the current distance S is greater than 6 miles or the current angle θ is greater than 45°, which indicates that the user may be far away from the device 200, or the user may be on a different floor. Thus, device 200 will not be controlled to execute the operation corresponding to the control signal. If the current distance S is less than 6 miles and the current angle θ is less than 45°, the device 200 will be controlled to execute the operation.

In this embodiment, because the current position information of the controller 20 is a three-dimensional coordinate (x1, y1, z1) and the current position information of the receiver 10 is a three-dimensional coordinate (x2, y2, z2), the calculating application 1041 is implemented by the processor 101 to calculate a current distance S according to a formula $S=S_{AC}=\sqrt{(x1-x2)^2+(y1-y2)^2+(z1-z2)^2}$, and further to calculate a current distance $S_{AD}$ according to a formula $S_{AD}=\sqrt{(x1-x2)^2+(y1-y2)^2}$ or a current distance $S_{CD}$ according to a formula $S_{CD}=\sqrt{(Z1-Z2)^2}$. The calculating application 1041 is further implemented by the processor 101 to calculate the current angle θ according to at least two values chosen from $S_{AC}$, $S_{AD}$, or $S_{CD}$. In this embodiment, the calculating application 1041 calculates the current angle θ according to a formula $\theta=\arcsin(S_{CD}/S_{AC})$ if $S_{CD}$ and $S_{AC}$ are calculated, or a formula $\theta=\arccos(S_{AD}/S_{AC})$ if $S_{AD}$ and $S_{AC}$ are calculated, or a formula θ=arctg ($S_{CD}/S_{AD}$) if $S_{CD}$ and $S_{AD}$ are calculated, or a formula θ=arctg ($S_{CD}/S_{AD}$) or θ=arcctg ($S_{AD}/S_{CD}$) if $S_{AD}$ and $S_{CD}$ are calculated.

In the embodiment, the control system 100 can be configured to be more secure by having the processing unit 203 encrypts the control signal before transmitting the control signal to the receiver 10. The processor 101 of the receiver 10 will decrypt the encrypted control signal after the control signal is received.

Figure 5:
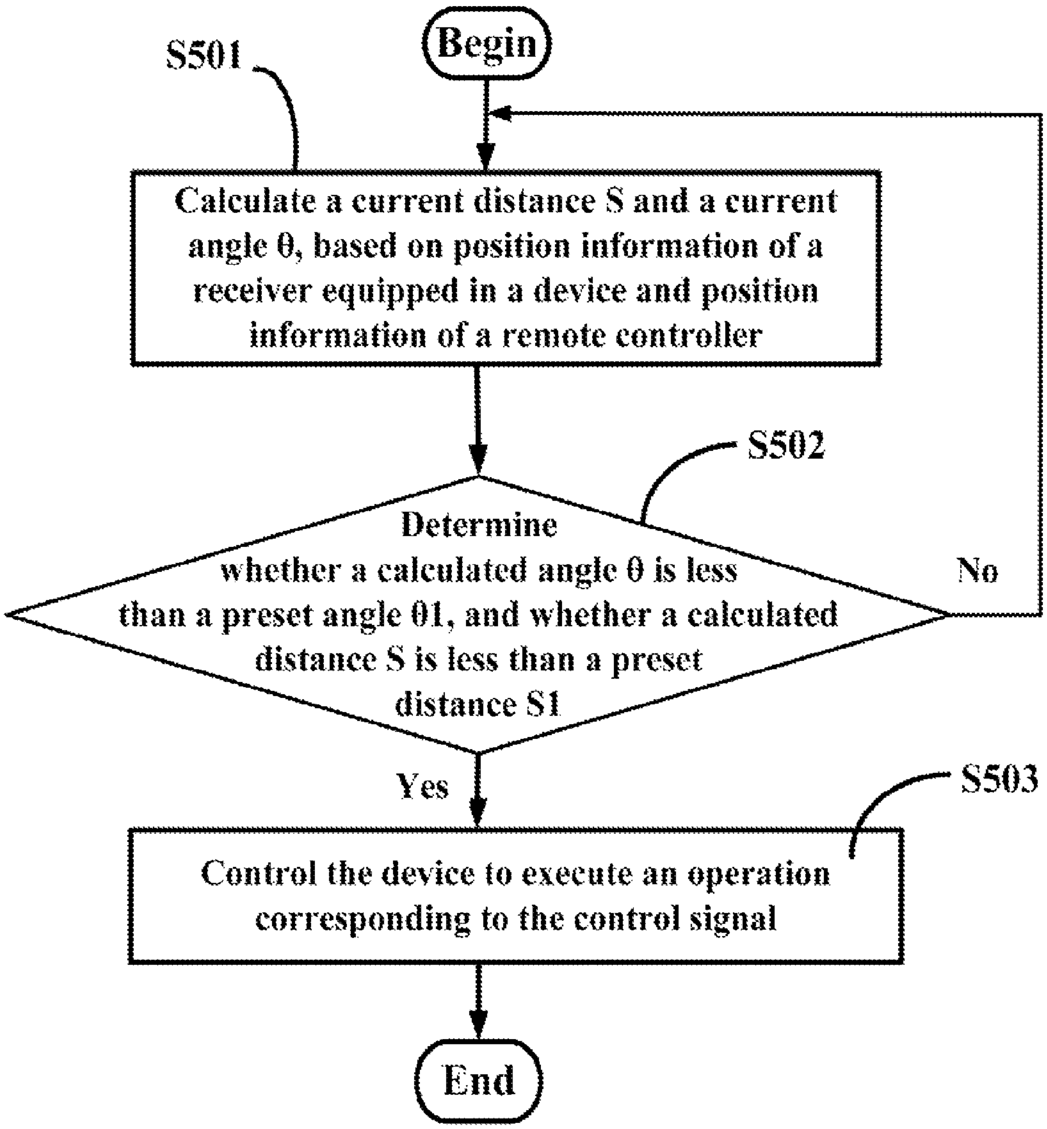
FIG. 5 is a flowchart of a control method for remotely controlling the device of FIG. 1, in accordance with an exemplary embodiment.

Referring to FIG. 5, a flowchart of a control method for remotely controlling the device 200 is shown.

In step S501, the processor 101 implements the calculating application 1041 to calculate the current distance S and the current angle θ, based on the position information of the receiver 10 and the controller 20.

In step S502, the processor 101 implements the determining application 1042 to determine whether the calculated current angle θ is less than the preset angle θ1, and whether the calculated current distance S is less than the preset distance S1. If the calculated current angle θ is less than the preset angle θ1 and the calculated current distance S is less than the preset distance S1, the procedure goes to step S503, otherwise the procedure goes to step S501.

In step S503, the processor 101 implements the control application 1043 to control the device 200 to execute an operation corresponding to the control signal.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A remote control system comprising:

a receiver to be equipped in a device; and a remote controller comprising a first positioning unit to obtain current position information of the remote controller, a transmitting unit, and a processing unit to transmit a control signal and the current position information of the remote controller to the receiver through the transmitting unit;

the receiver comprising:

a second positioning unit to obtain current position information of the receiver;

a receiving unit to receive the transmitted control signal and the current position information of the remote controller;

a storage unit storing a preset distance S1 between the remote controller and the receiver and a preset angle θ1 between a connection line L connecting the remote controller and the receiver and a horizontal plane P where the receiver locates, the storage unit further storing a plurality of applications; and a processor to execute the plurality of applications, wherein the plurality of applications comprise instructions executable by the processor to:

calculate a current distance S between the remote controller and the receiver and a current angle θ between the connection line L and the horizontal plane P, based on the current position information of the remote controller and the receiver;

determine whether the calculated current angle θ is less than the preset angle θ1, and whether the calculated current distance S is less than the preset distance S1; and control the device to execute an operation corresponding to the control signal if the current angle θ is less than the preset angle θ1 and the current distance S is less than the preset distance S1.

2. The remote control system as described in claim 1, wherein the first positioning unit is a global position system (GPS) to acquire real-time three-dimensional coordinate (x1, y1, z1) of the remote controller, the second positioning unit is a global position system (GPS) to acquire real-time three-dimensional coordinate (x2, y2, z2) of the receiver.

3. The remote control system as described in claim 2, wherein the processor calculates the current distance S according to a formula $S=\sqrt{(x1-x2)^2+(y1-y2)^2+(z1-z2)^2}$.

4. The remote control system as described in claim 3, wherein the processor calculates a first distance between the receiver and a projection point of the remote controller on the plane the receiver locates according to a formula $S_a=\sqrt{(x1-x2)^2+(y1-y2)^2}$ or a second distance between the projection point and the remote controller according to a formula $S_b=\sqrt{(Z1-Z2)^2}$, and further calculates the current angle θ according to at least two values chosen form S, $S_a$, or $S_b$.

5. The remote control system as described in claim 4, wherein the processor calculates the current angle θ according to a formula θ=arcsin ($S_b/S$) if $S_b$ and S are calculated, or a formula θ=arccos ($S_a/S$) if $S_a$ and S are calculated, or a formula θ=arctg ($S_b/S_a$) or a formula θ=arcctg ($S_a/S_b$) if $S_a$ and $S_b$ are calculated.

6. The remote control system as described in claim 1, wherein the processing unit of the remote controller further encrypts the control signal before transmitting the control signal to the receiver, and the processor of the receiver further decrypts the encrypted control signal after the control signal is received.

7. A remote control method applied in a remote control system, the remote control system comprising a receiver equipped in a device and a remote controller, the remote controller comprising a first positioning unit to obtain current position of the remote controller, the current position information of the remote controller and a control signal being transmitted to the receiver, the receiver comprising a second positioning unit to obtain current position information of the receiver, and a storage unit storing a preset distance S1 between the remote controller and the receiver and a preset angle θ1 between a connection line L connecting the remote controller and the receiver and a horizontal plane P the receiver locates, the remote control method comprising:

calculating a current distance S between the remote controller and the receiver and a current angle θ between a connection line L connecting the remote controller and the receiver and a horizontal plane P where the receiver locates, based on the current position information of the remote controller and the receiver;

determining whether the calculated current angle θ is less than the preset angle θ1, and whether the calculated current distance S is less than the preset distance S1; and controlling the device to execute an operation corresponding to the control signal if the current angle θ is less than the preset angle θ1 and the current distance S is less than the preset distance S1.

8. The remote control method as described in claim 7, wherein the current position information of the receiver is a three-dimensional coordinate (x2, y2, z2) of the receiver, and the current position information of the remote controller is a three-dimensional coordinate (x1, y1, z1) of the remote controller.

9. The remote control method as described in claim 8, wherein the current distance S is calculated according to a formula $S=\sqrt{(x1-x2)^2+(y1-y2)^2+(z1-z2)^2}$.

10. The remote control method as described in claim 9, wherein the calculating step further comprises calculating a first distance between the receiver and a projection point of the remote controller on the plane the receiver locates according to a formula $S_a=\sqrt{(x1-x2)^2+(y1-y2)^2}$ or a second distance between the projection point and the remote controller according to a formula $S_b=\sqrt{(Z1-Z2)^2}$, and further calculating the current angle θ according to at least two values chosen from S, $S_a$, or $S_b$.

11. The remote control method as described in claim 10, wherein the current angle θ is calculated according to a formula θ=arcsin ($S_b$/S) if $S_b$ and S are calculated, or a formula θ=arccos ($S_a$/S) if $S_a$ and S are calculated, or a formula θ=arctg ($S_b/S_a$) or a formula θ=arcctg ($S_a/S_b$) if $S_a$ and $S_b$ are calculated.

12. The remote control method as described in claim 7 further comprising a step of encrypting the control signal before transmitting the control signal to the receiver, and a step of decrypting the encrypted control signal after the control signal is received.

* * * * *